United States Patent [19]

Takahashi

[11] Patent Number: 5,763,048

[45] Date of Patent: Jun. 9, 1998

[54] MATTE DECORATIVE SHEET HAVING SCRATCH RESISTANCE

[75] Inventor: Kazuhiro Takahashi, Tokyo-To, Japan

[73] Assignee: Dai Nippon Printing Co., Ltd., Japan

[21] Appl. No.: 413,996

[22] Filed: Mar. 30, 1995

[30] Foreign Application Priority Data

Mar. 31, 1994 [JP] Japan ................................ 6-085881

[51] Int. Cl.$^6$ ........................................................ B32B 5/16
[52] U.S. Cl. .......................... 428/147; 428/142; 428/332; 428/327; 428/412
[58] Field of Search .............................. 428/142, 147, 428/332, 327, 412

[56] References Cited

U.S. PATENT DOCUMENTS

| | | | |
|---|---|---|---|
| 3,673,055 | 6/1972 | Sheld | 161/183 |
| 4,239,797 | 12/1980 | Sachs | 428/147 |
| 4,457,965 | 7/1984 | Rocholl et al. | 428/147 |
| 4,501,783 | 2/1985 | Hiragami et al. | 428/147 |
| 4,849,265 | 7/1989 | Ueda et al. | 428/147 |
| 5,059,471 | 10/1991 | McNally et al. | 428/147 |

FOREIGN PATENT DOCUMENTS

| | | |
|---|---|---|
| 46-30847 | 9/1971 | Japan. |
| 58-15183 | 3/1983 | Japan. |
| 62-21815 | 1/1987 | Japan. |

*Primary Examiner*—William Watkins
*Attorney, Agent, or Firm*—Parkhurst & Wendel, L.L.P

[57] ABSTRACT

There is provided a matte decorative sheet having scratch resistance, including a PVC substrate and, provided thereon, a protective layer of a cured resin which has been cured by irradiation with an ionizing radiation. The protective layer contains fine particles of an impact-resistant resin, namely, polycarbonate resin, having a particle diameter of 0.1 to 50 μm and an Izod impact strength of not less than 10 kg.cm/cm.

3 Claims, 1 Drawing Sheet

MATTE DECORATIVE SHEET HAVING SCRATCH RESISTANCE

BACKGROUND OF THE INVENTION

1. Field of the Invention

The present invention relates to a decorative sheet. More particularly, the present invention relates to a matte decorative sheet having scratch resistance enough to be usable as a decorative material with which horizontal surfaces of tables, shelves, rails and stiles, floors, and the like are decorated.

2. Background Art

A decorative sheet provided on furniture, walls, floors, and the like for the purpose of imparting a design and protecting the surface thereof is known in the art. The decorative sheet used for the above purposes generally comprises a plastic film or the like with a pattern being printed thereon. In order to protect the surface of the decorative sheet, a method is known which comprises coating an ionizing radiation-curable resin on a decorative sheet and irradiating the resultant coating with an ionizing radiation, such as ultraviolet light or electron beam, to form a surface protective layer. For the protective layer formed of the above curing resin, the degree of crosslinking of the resin should be enhanced in order for the surface protective layer to have satisfactory hardness. This, however, deteriorates the impact resistance of the protective layer, causing cracking or checking to readily occur on the cured coating when the decorative sheet is subjected to post forming including wrapping, vacuum lamination, and V cutting.

Japanese Patent Publication No. 21815/1987 teaches a method wherein an inorganic filler, such as silica or alumina, is incorporated into a photopolymerizable resin for the protective layer of a decorative sheet so as to enhance the hardness and the abrasion resistance of the protective layer. This method, however, has a problem that the incorporation of the inorganic filler results in lowered transparency of the protective layer. In order to minimize the lowering in transparency, the particle size of the inorganic filler should be made extremely small, e.g., the order of 0.001 to 0.1 µm. Further, a troublesome chemical treatment, e.g., grafting of the surface of the filler, must be carried out for rendering the inorganic filler compatible with the photopolymerizable resin. Further, in the above method, although the protective layer is hard, it is brittle, so that the protective layer is likely to crack or fall to pieces in the course of the above post forming.

Japanese Patent Publication No. 15183/1983 discloses a protective layer, formed on the surface of a decorative sheet, comprising a dispersion of fine particles of polyethylene in a coating of a crosslinked polymer formed from a photopolymerizable resin. However, it has been found by the present inventors that the scratch resistance and the abrasion resistance of the protective layer are inferior to those of a protective layer wherein an inorganic filler is dispersed, and little or no improvement can be attained in the above mentioned problems of cracking and the like caused by deformation of the sheet in the post forming.

Accordingly, an object of the present invention is to provide a matte decorative sheet free from the drawbacks of the prior art and having high surface hardness, scratch resistance, and abrasion resistance.

SUMMARY OF THE INVENTION

It has now been found that the above object can be attained by providing a protective layer containing fine particles, having a specific particle diameter, of a specific resin on a substrate for a decorative sheet.

Thus, the matte decorative sheet of the present invention comprises a substrate for a decorative sheet and, provided on the substrate, a protective layer of a cured resin which has been cured by irradiation with an ionizing radiation, the protective layer containing fine particles of an impact-resistant resin having a particle diameter of 0.1 to 50 µm and an Izod impact strength (according to JIS K7110) of not less than 10 kg.cm/cm.

The decorative sheet of the present invention has better scratch resistance than a protective layer consisting of an ionizing radiation-cured resin alone, by virtue of the impact resistance of the fine particles dispersed in the ionizing radiation-cured resin constituting the protective layer, and, at the same time, has good formability in post forming, e.g. folding.

Further, since the fine particles are of a resin, they, unlike an inorganic filler, require no treatment for imparting to the fine particles an affinity for an organic compound and, as such, has a high adhesion to the ionizing radiation-cured resin.

Furthermore, since the fine particles of the resin have a smaller difference in refractive index from the ionizing radiation-cured resin as compared with inorganic fillers and, moreover, the particles themselves are transparent, the protective layer of the present invention is by nature transparent or translucent. Accordingly, when no colorant is added to the protective layer, the print pattern provided on the substrate of the decorative sheet and the color tone of the substrate can be clearly perceived. On the other hand, when a colorant is added to the protective layer, the tone of the colorant can be effectively brought out.

Figure 1:
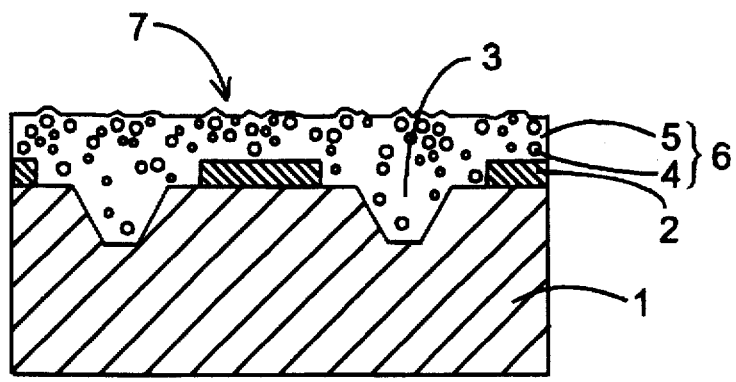
FIG. 1 is a schematic cross-sectional view of one embodiment of the decorative sheet according to the present invention.

In the drawing, numeral 1 denotes a substrate, numeral 2 a printed pattern, numeral 3 a recess, numeral 4 fine particles of an impact-resistant resin, numeral 5 an ionizing radiation-cured resin, numeral 6 a protective layer, and numeral 7 a decorative sheet.

DETAILED DESCRIPTION OF THE INVENTION

The substrate for a decorative sheet according to the present invention is most preferably a synthetic resin sheet from the viewpoint of formability and coatability. Examples thereof include sheets of polyolefins such as polyethylene and polypropylene; vinyl resins such as polyvinyl chloride, polyvinylidene chloride, polyvinyl alcohol, ethylene/vinyl acetate copolymer, and ethylene/vinyl alcohol copolymer; polyesters such as polyethylene terephthalate and polybutylene terephthalate; styrene resins such as polystyrene, acrylonitrile/styrene copolymer, and ABS resin; polycarbonate; nylon; and ionomer resins.

Among them, a vinyl chloride sheet, particularly a resin sheet of a semirigid polyvinyl chloride, having a thickness of 50 to 300 µm and containing 8 to 30 parts by weight of a plasticizer, or a resin sheet having flexibility and elastic properties comparable to the polyvinyl chloride sheet of the above type are preferred from the viewpoint of formability, impact resistance, and scratch resistance of the decorative sheet.

Other substrates usable in the present invention include paper, such as tissue paper and woodfree paper, and fabrics, such as woven fabrics and nonwoven fabrics.

The surface of the substrate may have a print representing, for example, wood grains, marble grains, surface pattern of natural leather, texture, or abstract pattern. Further, recesses including those imitating the vessel portion of a wood grain and other recesses having shapes similar to marble grains, mottle of leather, texture, and the like may be provided in combination with the above print pattern.

The printing on the substrate may be carried out by intaglio printing such as gravure or gravure offset printing; letterpress printing such as typographic or flexographic printing; lithographic printing such as lithographic offset or Di-Litho printing; or printing not utilizing any plate, such as silk screen printing, electrostatic printing, or ink jet printing.

The substrate, for a decorative sheet, having a recess may be either one having a recess directly formed on the above print or a laminate sheet prepared by heat-bonding the printed face of a thermoplastic synthetic resin sheet having a print to another thermoplastic synthetic resin sheet and embossing the surface of the resultant laminate, that is, a laminate sheet prepared by the so-called "double embossing."

When the substrate has a printed pattern layer, abrasion resistance is required of the substrate. In order to impart the abrasion resistance in addition to the scratch resistance, the printed pattern layer is preferably sandwiched between two substrate sheets to form the following layer construction: sheet substrate as back side/printed pattern layer/transparent surface sheet substrate/transparent protective layer.

The reason why the above layer construction is preferred is that the resistance to instantaneous and local concentration of stress on the surface suffices for the scratch resistance, i.e., the resistance to scratch, whereas the abrasion resistance, i.e., the resistance to scraping of the surface layer by long-term repeated abrasion, can be effectively imparted only by physical thickness of the protective layer.

However, when the thickness of the protective layer is excessively large (particularly over 50 μm), problems occur such as warping of the decorative sheet due to shrinkage on curing and deteriorated adhesion of coating due to the concentration of shrinkage stress at the interface of the protective layer and the substrate.

For this reason, the optimal method is that the thickness of protective layer is limited to up to 50 μm which suffices for attaining the scratch resistance and the abrasion resistance, which is still unsatisfactory after the provision of the protective layer, is imparted by taking advantage of the thickness of the transparent surface sheet substrate (see Example 8).

A wiping treatment for filling a pigmented coating into the recess on the surface of the substrate can be carried out, for example, using a coating comprising as a vehicle a thermoplastic resin, a thermosetting resin, or an ionizing radiation-curable resin.

FIG. 1 is a cross-sectional view of the decorative sheet of the present invention prepared by forming a printed pattern and a recess on the surface of a substrate for a decorative sheet and then forming thereon a protective layer.

The protective layer of the present invention provided on the above substrate comprises a dispersion of fine particles of an impact-resistant resin, ranging in diameter from 0.1 to 50 μm, in a cured resin which has been cured by irradiation with an ionizing radiation.

Ionizing radiation-curable resins usable in the present invention include polymers, prepolymers, and monomers which can cause a crosslinking polymerization reaction by irradiation with an ionizing radiation to form a solid.

Specific examples thereof include radical polymerizable compounds, having a (meth)acryloyl group (the term "(meth)acryloyl" used herein means both acryloyl and methacryloyl), such as (meth)acrylamide, (meth) acrylonitrile, (meth)acrylic acid, or (meth)acrylic esters; cation polymerizable compounds such as an epoxy, a cyclic ether, a cyclic acetal, a lactone, a vinyl monomer or a combination of cyclic siloxane with an aryldiazonium salt, a diaryliodonium salt or the like; and polyene-thiol compounds comprising a compound having a thiol group, for example, trimethylolpropane trithioglycolate, trimethylolpropane trithiopropylate or pentaerythritol tetrathioglycol, and a polyene compound.

Among the radical polymerizable compounds, monofunctional monomers include methyl (meth)acrylate, ethyl (meth)acrylate, butyl (meth)acrylate, methoxyethyl (meth) acrylate, methoxybutyl (meth)acrylate, butoxyethyl (meth) acrylate, 2-ethylhexyl (meth)acrylate, N,N-dimethylaminomethyl (meth)acrylate, N,N-dimethylaminoethyl (meth)acrylate, N,N-diethylaminoethyl (meth)acrylate, N,N-diethylaminopropyl (meth)acrylate, N,N-dibenzylaminoethyl (meth)acrylate, lauryl (meth) acrylate, isobornyl (meth)acrylate, ethylearbitol (meth) acrylate, phenoxyethyl (meth)acrylate, phenoxypolyethylene glycol (meth)acrylate, tetrahydroxyfurfuryl (meth) acrylate, methoxy tripropylene glycol (meth)acrylate, 2-(meth)acryloyloxyethyl-2-hydroxypropyl phthalate, and 2-(meth)acryloyloxypropylhydrogen phthalate.

Among the radical polymerizable compounds, polyfunctional monomers include ethylene glycol di(meth)acrylate, diethylene glycol di(meth)acrylate, triethylene glycol di(meth)acrylate, propylene glycol di(meth)acrylate, dipropylene glycol di(meth)acrylate, neopentyl glycol di(meth) acrylate, 1,6-hexane diol di(meth)acrylate, 1,9-nonanediol di(meth)acrylate, tetraethylene glycol di(meth)acrylate, tripropylene glycol di(meth)acrylate, bisphenol A di(meth) acrylate, trimethylolpropane tri(meth)acrylate, trimethylolpropane ethyleneoxide tri(meth)acrylate, pentaerythritol tri (meth)acrylate, pentaerythritol tetra(meth)acrylate, dipentaerythritol penta(meth)acrylate, dipentaerythritol hexa(meth)acrylate, glycerol polyethyleneoxide tri(meth) acrylate, and tris(meth)acryloyloxy ethylphosphate.

Examples of the prepolymer include (meth)acrylates and unsaturated polyesters, such as alkyd (meth)acrylate, urethane (meth)acrylate, epoxy (meth)acrylate, polyester (meth)acrylate, and polybutadiene (meth)acrylate.

Among the above compounds having a (meth) acryloyl group, compounds having an acryloyl group, i.e., acrylates, have a higher polymerization reaction rate. Therefore, when importance is attached to the productivity in the preparation of the protective layer, an acrylate is more preferred than a methacrylate.

The above compounds may be used alone or as a mixture of two or more. When the above compound containing (meth)acryloyl groups is used, the sum of (meth)acryloyl groups in the resin is preferably 0.2 to 12 mmol/g, more preferably 2 to 10 mmol/g.

The fine particles of an impact-resistant resin having a particle diameter of 0.1 to 50 μm, which is to be incorporated and dispersed in the above ionizing radiation-curable resin, has an Izod impact strength (JIS X7110) of not less than 10 kg.cm/cm, preferably not less than 30 kg.cm/cm.

When fine particles of a resin having an Izod impact strength of less than 10 kg.cm/cm are used, the resistance of the particles per se to impact or scratching is remarkably poor, which in turn results in poor resistance of a protective layer, containing such particles, to impact or scratching.

Further, in this case, the suitability for forming, such as folding, is lowered, causing unfavorable phenomena, such as cracking, to be easily created in the course of forming.

Examples of the impact-resistant resin having an Izod impact strength of not less than 10 kg.cm/cm include polycarbonate, rigid polyvinyl chloride, polyvinylidene chloride, polyacetal, nylon, ethyl cellulose, cellulose nitrate, propyl cellulose, cellulose acetate, polycarbonate, polyethylene terephthalate, trifluorochloroethylene, vinylidene fluoride, tetrafluoroethylene, polyurethane, impact-resistant polymethyl methacrylate, impact-resistant polypropylene, glass-fiber reinforced polyurethane, and glass fiber-reinforced unsaturated polyester. Among them, polycarbonate resin is preferred from the viewpoint of transparency.

The polycarbonate is a product of polycondensation of carbonic acid with a polyhydric alcohol or a polyhydric phenol. Among others, preferred is a polycarbonate resin wherein the polyhydric phenol is bisphenol A. Such a polycarbonate will be hereinafter referred to as "bisphenol-type polycarbonate resin." Among the bisphenol-type polycarbonate resins, a bisphenol-type polycarbonate resin having an average degree of polymerization of 50 to 160, preferably an average degree of polymerization of 80 to 130, is particularly preferred because it generally has a high Izod impact strength of 60 to 80 kg.cm/cm. In this case, when the average degree of polymerization is less than 50, the strength is deteriorated. On the other hand, when the average degree of polymerization exceeds 160, the resin is fragile in the form of fine particles and, at the same time, poses problems of poor adhesion to the ionizing radiation-curable resin and lowered coating strength.

The fine particles of the impact-resistant resin are preferably in a spherical form or a form similar thereto. Further, fine particles having any other form may also be used so far as they do not adversely affect the scratch resistance, formability, and matte effect of the coating.

The fine particles of the impact-resistant resin may be prepared by various methods such as pulverization or polymerization methods. Among others, the fine particles prepared by precipitation of fine particles from a solvent according to the method described in Japanese Patent Publication No. 30847/1971 have a smooth surface, good wettability by the ionizing radiation-curable resin and good dispersibility. These properties can impart good impact resistance, formability, and scratch resistance to the protective layer.

The fine particles of an impact-resistant resin may be dispersed in the ionizing radiation-curable resin by a dry process using a jet mill or the like, or by a wet process using a roll mill, a ball mill, a sand mill, or the like.

A composition comprising fine particles of the impact-resistant resin thus dispersed in an ionizing radiation-curable resin is coated on a substrate. In this case, as a solvent for dissolving the ionizing radiation-curable resin therein and regulating the viscosity or the like to impart coatability to the resin, use may be made of esters such as ethyl acetate, butyl acetate, and cellosolve acetate; ketones such as acetone, methyl ethyl ketone, and ethyl isobutyl ketone; and alcohols, such as methyl alcohol, ethyl alcohol, and isopropyl alcohol. They may be used alone or in the form of a mixture of two or more.

If necessary, other additives may be added to the composition in such an amount as will not sacrifice the scratch resistance, formability, matte effect, and curability of the coating.

Examples of such additives include particulate dispersion improvers having a particle diameter of not more than 1/3 of that of fine particles of the impact-resistant resin, such as silica, talc, calcium carbonate, barium sulfate, and organic bentonite; surfactants for improving the dispersibility of fine particles of the impact-resistant resin or preventing the electrification of the coating; and colorants such as dyes and pigments.

The ionizing radiation-curable resin composition may be coated on the surface of the substrate by gravure coating, gravure reverse coating, gravure offset coating, roll coating, reverse roll coating, knife coating, wire bar coating, flow coating, bull nose knife coating, dip coating, wheeler coating, spinner coating, spray coating, silk screen coating, cast coating, and brush coating.

The ionizing radiation-curable resin composition coated on the substrate is exposed to an ionizing radiation to cure the resin, thus completing a protective layer.

Ionizing radiations usable in the present invention include electromagnetic waves or corpuscular rays, such as visible light, ultraviolet light, X-rays, and electron beams. Among them, ultraviolet light and electron beams are mainly used.

When the ionizing radiation-curable layer is cured by exposure to ultraviolet rays, at least one photopolymerization initiator selected from benzoin, benzoin methyl ether, acetophenone, benzophenone, Michler's ketone, diphenyl sulfide, dibenzyl disulfide, diethyl oxide, triphenyl biimidazole, and isopropyl-N,N-dimethylaminobenzoate may be used in an amount of 0.1 to 10 parts by weight based on 100 parts by weight of the ionizing radiation-curable resin.

High pressure mercury lamps, ultra-high pressure mercury lamps, low pressure mercury lamps, carbon arcs, black light, and metal halide lamps may be used as ultraviolet light sources.

Electron beam sources usable in the invention include various electron beam accelerators, such as a Cockoroft-Walton (type) accelerator, a van de Graaff accelerator, a resonance transformer accelerator, an insulated core transformer accelerator, a linear accelerator, a Dynamitron accelerator, and a high-frequency accelerator which can apply an electron beam having an energy of 100 to 1000 KeV, preferably 100 to 300 KeV.

The exposure dose is usually about 0.5 to 30 Mrad.

Regarding the application of the ionizing radiation, a method may be used wherein ultraviolet rays are first applied to cure the ionizing radiation-curable resin layer at least to such an extent that the surface of the layer becomes dry to the touch, followed by the application of an electron beam to completely cure the ionizing radiation-curable resin layer.

The thickness of the protective layer thus formed is about 1 to 50 µm with a thickness of 10 to 30 µm being particularly preferred from the viewpoint of balance between scratch resistance and formability.

The scratch-resistant decorative sheet of the present invention having the above constitution, by virtue of the incorporation of fine particles of an impact-resistant resin having a particle diameter of 0.1 to 50 µm in an ionizing radiation-curable resin, is transparent or translucent and has impact resistance and, at the same time, matte effect.

Further, the irregularities of the surface of the coating derived from the presence of the fine particles can offer a matte effect.

When the decorative sheet of the present invention is used, it is laminated to various materials. For example, it is applied to fabrics such as nonwoven fabrics and woven fabrics; wood substrates such as particle boards and plywood; plastic plates such as ABS plates and acrylic plates; metallic foils such as aluminum foils and lead foils; metallic plates such as aluminum plates and steel plates; and ceramic plates such as calcium silicate plates, gypsum boards, and cement boards. Among combinations of the above laminating materials with the decorative sheet substrates, a laminate prepared by providing a protective layer on the surface of a decorative sheet substrate of a synthetic resin sheet and laminating as a laminating material a metallic foil on the back side of the substrate is preferred because the suitability for forming, such as wrapping, V cutting, or vacuum lamination, particularly the formability to a desired shape or shape retention, can be improved by virtue of synergistic effect of the flexibility or softness of the synthetic resin and the plastic deformation of the metal. Further, in the case of the above laminate, high heat conductivity and high heat resistance of the metal can improve the cigarette resistance of the resin sheet, and even when a lighted cigarette is dropped on the surface of the protective layer and, in this state, allowed to stand, scorch and burning are much less likely to occur as compared with the case where a synthetic resin sheet alone is used.

The following examples further illustrate the present invention but are not intended to limit it.

In the examples, "parts" are by weight.

EXAMPLE 1

A print layer having a pattern similar to a woodgrain pattern of an oak was provided on the surface of a polyvinyl chloride sheet (plasticizer 23 phr, thickness 200 µm) by gravure printing using inks of three colors containing a vinyl chloride/vinyl acetate copolymer resin as a vehicle, thereby preparing a substrate for a decorative sheet. Then, the following ionizing radiation-curable resin composition (A) was coated on the surface of the substrate for a decorative sheet remote from the polyvinyl chloride sheet by roll coating, and the resultant wet coating was dried to remove the solvent, thereby forming a 25 µm-thick coating. The coating was irradiated with ultraviolet light from two high pressure mercury lamps of 160 W/cm at a line speed of 20 m/minute to prepare a decorative sheet having a transparent ionizing radiation-curable resin layer.

| Ionizing radiation-curable resin composition (A) | |
| --- | --- |
| Ionizing radiation-curable resin | |
| Urethane acrylate prepolymer | 29 parts |
| Polyethylene glycol diacrylate | 6 parts |
| Ethyl carbitol acrylate | 6 parts |
| 2-Ethylhexyl acrylate | 7 parts |
| Photopolymerization initiator (methylbenzoyl formate) | 2 parts |
| Solvent (isopropyl alcohol etc.) | 44 parts |
| Fine particles of impact-resistant resin (spherical fine particles, ranging in diameter from 0.1 to 50 µm, of a bisphenol-type polycarbonate resin having an average degree of polymerization of 90 and an Izod impact strength of 70 kg · cm/cm) | 4 parts |

EXAMPLE 2

A decorative sheet was prepared in the same manner as in Example 1, except that the following ionizing radiation-curable resin composition (B) was used instead of the ionizing radiation-curable resin composition (A) of Example 1.

| Ionizing radiation-curable resin composition (B) | |
| --- | --- |
| Ionizing radiation-curable resin | |
| Urethane acrylate prepolymer | 29 parts |
| Polyethylene glycol diacrylate | 6 parts |
| Ethyl carbitol acrylate | 6 parts |
| 2-Ethylhexyl acrylate | 7 parts |
| Photopolymerization initiator (methylbenzoyl formate) | 2 parts |
| Solvent (isopropyl alcohol etc.) | 44 parts |
| Fine particles of impact-resistant resin (spherical fine particles, ranging in diameter from 0.1 to 50 µm, of a nylon 66 resin having water absorption of 2% and an Izod impact strength of 20 kg · cm/cm) | 4 parts |

EXAMPLE 3

A decorative sheet was prepared in the same manner as in Example 1, except that the following ionizing radiation-curable resin composition (C) was used instead of the ionizing radiation-curable resin composition (A) of Example 1.

| Ionizing radiation-curable resin composition (C) | |
| --- | --- |
| Ionizing radiation-curable resin | |
| Epoxy acrylate prepolymer | 35 parts |
| Isobornyl acrylate | 15 parts |
| Photopolymerization initiator (methylbenzoyl formate) | 2 parts |
| Solvent (isopropyl alcohol etc.) | 44 parts |
| Fine particles of impact-resistant resin (spherical fine particles, ranging in diameter from 0.1 to 50 µm, of a bisphenol-type polycarbonate resin having an average degree of Polymerization of 90 and an Izod impact strength of 70 kg · cm/cm) | 4 parts |

EXAMPLES 4 TO 6

Decorative sheets were prepared in the same manner as in Examples 1, except that ionizing radiation-curable resin compositions (D) (Example 4), (E) (Example 5), and (F) (Example 6) respectively having the same components as the ionizing radiation-curable resin compositions (A), (B), and (C) of Examples 1, 2, and 3 except for the absence of the photopolymerization initiator were used instead of the ionizing radiation-curable resin compositions (A), (B), and (C) of Examples 1, 2, and 3, and electron beam irradiation was carried out under conditions of 175 KeV, 3 Mrad, and line speed 30 m/minute instead of ultraviolet irradiation used in Examples 1 to 3.

EXAMPLE 7

A decorative sheet having the same construction as in Example 1 was prepared in the same manner as in Example 1, 2, and 3, except that, instead of irradiation of ultraviolet rays alone in Examples 1, 2, and 3, the irradiation of ultraviolet rays using two high pressure mercury lamps of 160 W/cm at a line speed of 20 m/minute was followed by irradiation of an electron beam under conditions of 17.5 KeV, 3 Mrad, and line speed 30 m/minute.

EXAMPLE 8

A print layer having a pattern similar to a woodgrain pattern of an oak was formed on the surface of the same polyvinyl chloride sheet (plasticizer 23 phr, thickness 200 µm) as used in Example 1 as a substrate for decorative purposes by gravure printing using inks of three colors containing a vinyl chloride/vinyl acetate copolymer resin as a vehicle. The printed face of the polyvinyl chloride sheet and another polyvinyl chloride sheet, which is transparent and has a thickness of 100 µm, were subjected to simultaneous embossing (doubling embossing) using a rotary hot press embossing plate having in its surface reverse irregularities of a woodgrain vessel portion under conditions of a plate temperature of 150° C., a line pressure of 1 ton, and a speed of 15 m/minute to laminate the two sheets on top of the other and, at the same time, to provide recesses corresponding to a woodgrain vessel on the surface of the transparent polyvinyl chloride sheet. Then, a black wiping ink containing a vinyl chloride/vinyl acetate copolymer resin as a vehicle was coated on the recesses, and wiping was conducted, thereby preparing a substrate for a decorative sheet. A decorative sheet having the same construction as in Example 1 was prepared in the same manner as in Example 1, except that the substrate for a decorative sheet prepared just above was used.

COMPARATIVE EXAMPLE 1

A decorative sheet having the same construction as in Example 1 was prepared in the same manner as in Example 1, except that the following ionizing radiation-curable resin composition (X) was used instead of the ionizing radiation-curable resin composition (A) of Example 1.

Ionizing radiation-curable resin composition (X)

| Ionizing radiation-curable resin composition (X) | |
|---|---|
| Ionizing radiation-curable resin | |
| Urethane acrylate prepolymer | 29 parts |
| Polyethylene glycol diacrylate | 6 parts |
| Ethyl carbitol acrylate | 8 parts |
| 2-Ethylhexyl acrylate | 7 parts |
| Photopolymerization initiator (methylbenzoyl formate) | 2 parts |
| Solvent (isopropyl alcohol etc.) | 44 parts |
| Fine particles of impact-resistant resin (fine particles, ranging in diameter from 0.1 to 50 µm, of a polyethylene resin having an Izod impact strength of 6 kg · cm/cm (Measurement and evaluation) | 4 parts |

The decorative sheets prepared in the above examples and comparative examples were subjected to the following measurements.

(1) Scratch test

It was carried out according to JIS K6902.

(2) Abrasion resistance

It was measured according to JIS K6902. The total load was 1060 g.

(3) Pencil hardness

It was measured according to JIS X5400. A decorative sheet sample having a pencil hardness of H or more was evaluated as acceptable (O) with a decorative sheet sample having a pencil hardness of P or less being evaluated as unacceptable (X).

(4) Nail scratching

A nail was placed perpendicularly to the sample face, and the sample was strongly scratched ten times when no scratch was observed, the sample was evaluated as acceptable (O), while when a scratch was observed, the sample was evaluated as unacceptable (X).

TABLE 1

| Example No. | Scratch test | Abrasion resistance | Pencil hardness | Nail scratching |
|---|---|---|---|---|
| Example 1 | 40 g | 300 times | O | O |
| Example 2 | 40 g | 300 times | O | O |
| Example 3 | 40 g | 300 times | O | O |
| Example 4 | 40 g | 300 times | O | O |
| Example 5 | 40 g | 300 times | O | O |
| Example 6 | 40 g | 300 times | O | O |
| Example 7 | 40 g | 300 times | O | O |
| Example 8 | 40 g | 1300 times | O | O |
| Comparative Example 1 | 10 g | 100 times | X | X |

What is claimed is:

1. A scratch-resistant matte decorative sheet comprising a substrate and, provided thereon, a protective layer of a cured resin which has been cured by irradiation with an ionizing radiation, said protective layer having a thickness of about 50 µm or less and containing fine particles of an impact-resistant bisphenol-type polycarbonate resin having an average degree of polymerization of 50 to 160, a particle diameter of 0.1 to 50 µm and an Izod impact strength of not less than 10 kg cm/cm.

2. The matte decorative sheet according to claim 1, wherein said substrate is a polyvinyl chloride sheet.

3. A scratch-resistant matte decorative sheet comprising a polyvinyl chloride substrate and, provided thereon, a protective layer of a cured resin which has been cured by irradiation with an ionizing radiation, said protective layer having a thickness of about 50 µm or less and containing fine particles of an impact-resistant polycarbonate resin having a particle diameter of 0.1 to 50 µm and an Izod impact strength of not less than 10 kg.cm/cm.

* * * * *